Jan. 5, 1932.    H. D. CHURCH    1,839,785
MOTOR VEHICLE
Filed Jan. 9, 1930    3 Sheets-Sheet 1
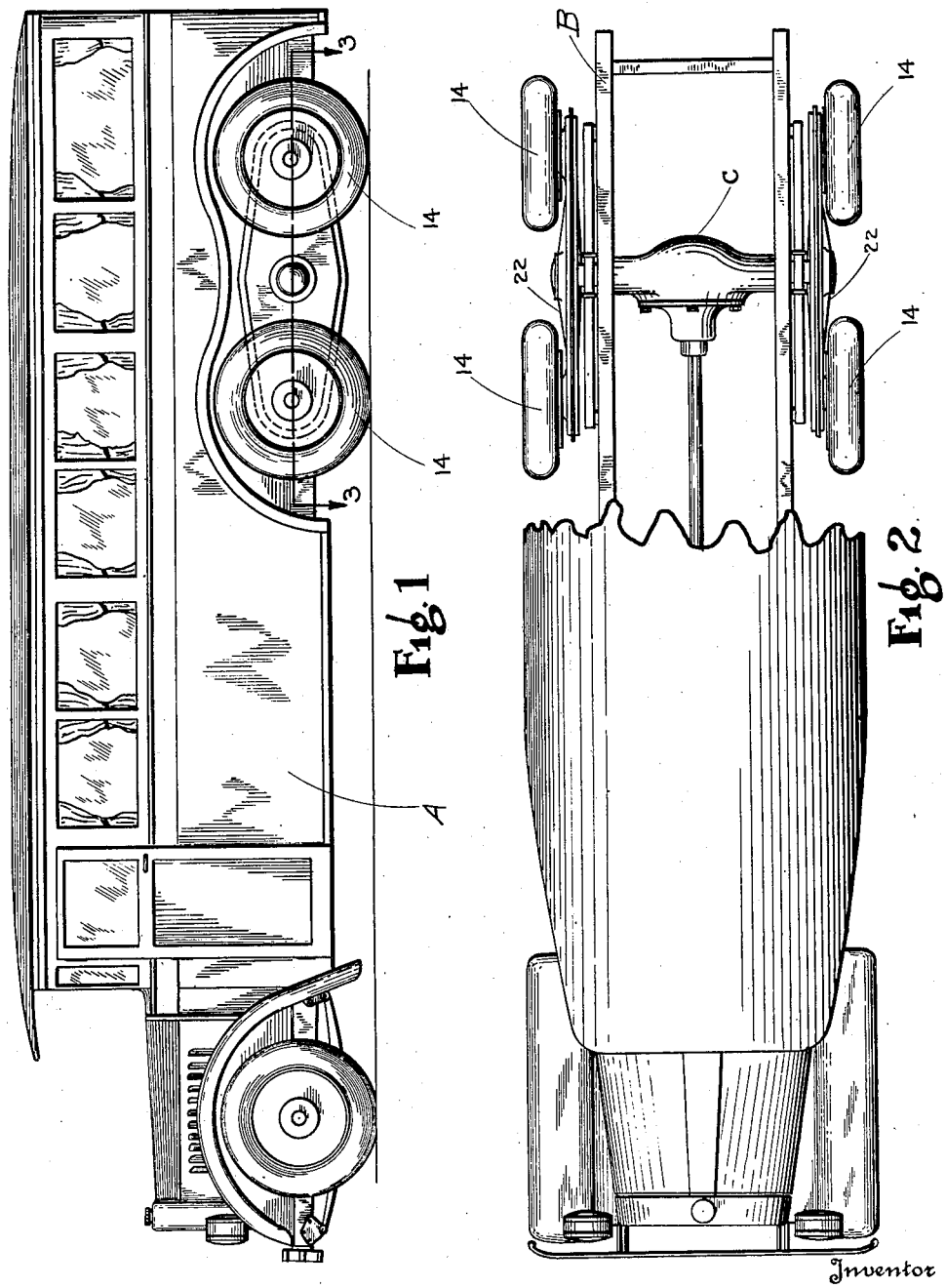
Harold D. Church.
By R. M. Cooper
Attorney Jan. 5, 1932. H. D. CHURCH 1,839,785
MOTOR VEHICLE
Filed Jan. 9, 1930 3 Sheets-Sheet 2
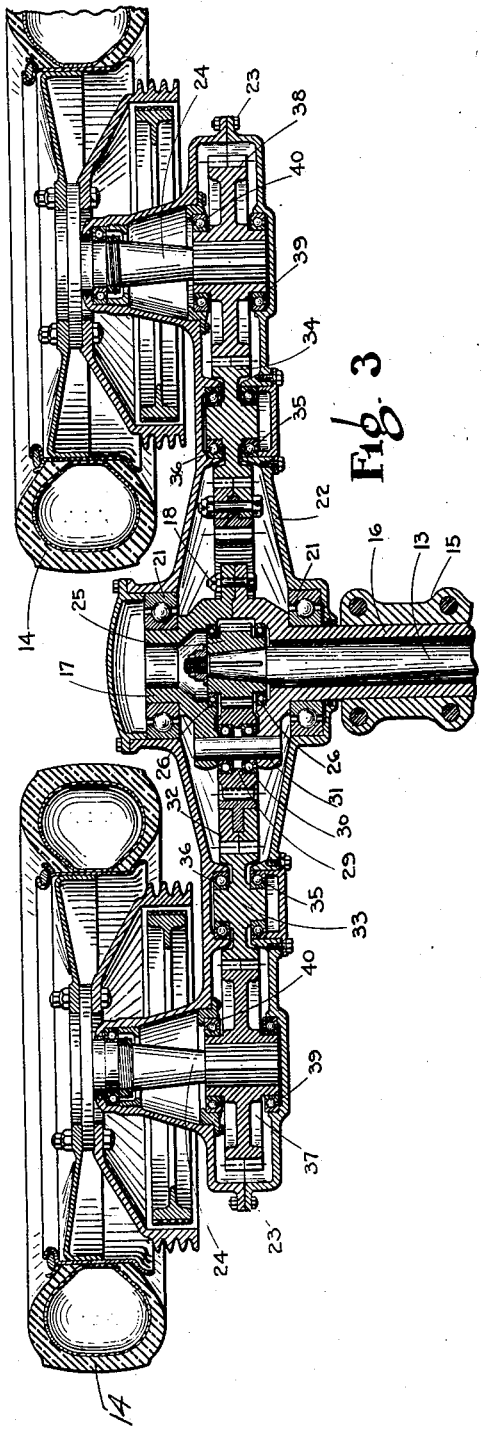
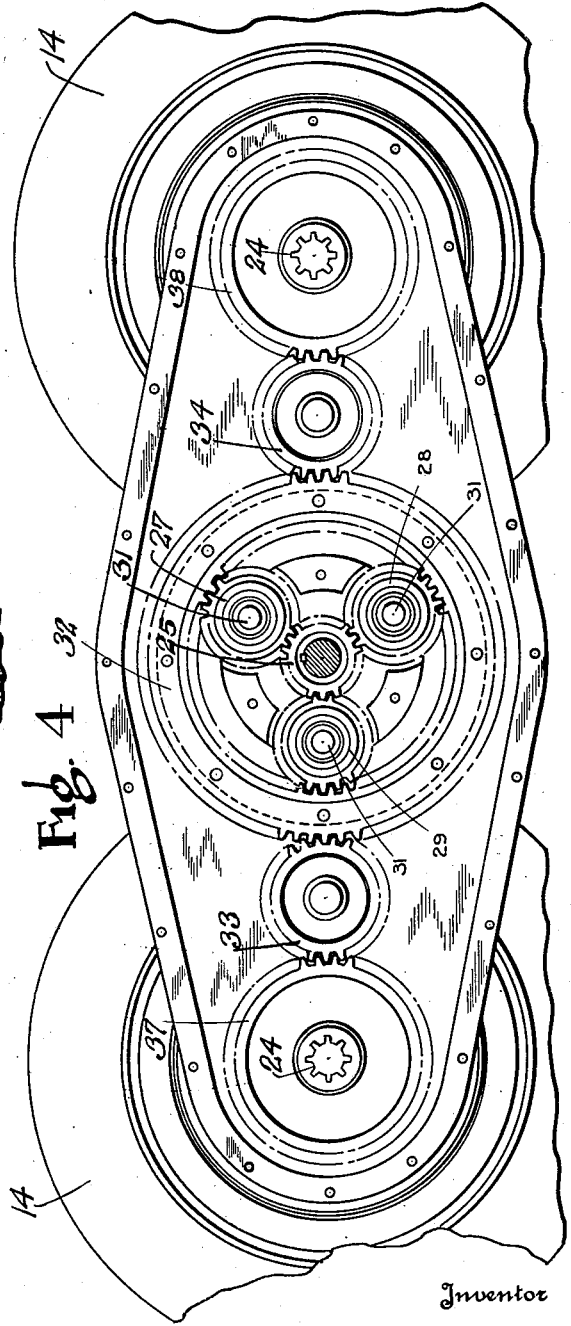
Inventor
HAROLD D. CHURCH.
By RMCooper
Attorney Jan. 5, 1932.   H. D. CHURCH   1,839,785
MOTOR VEHICLE
Filed Jan. 9, 1930   3 Sheets-Sheet 3
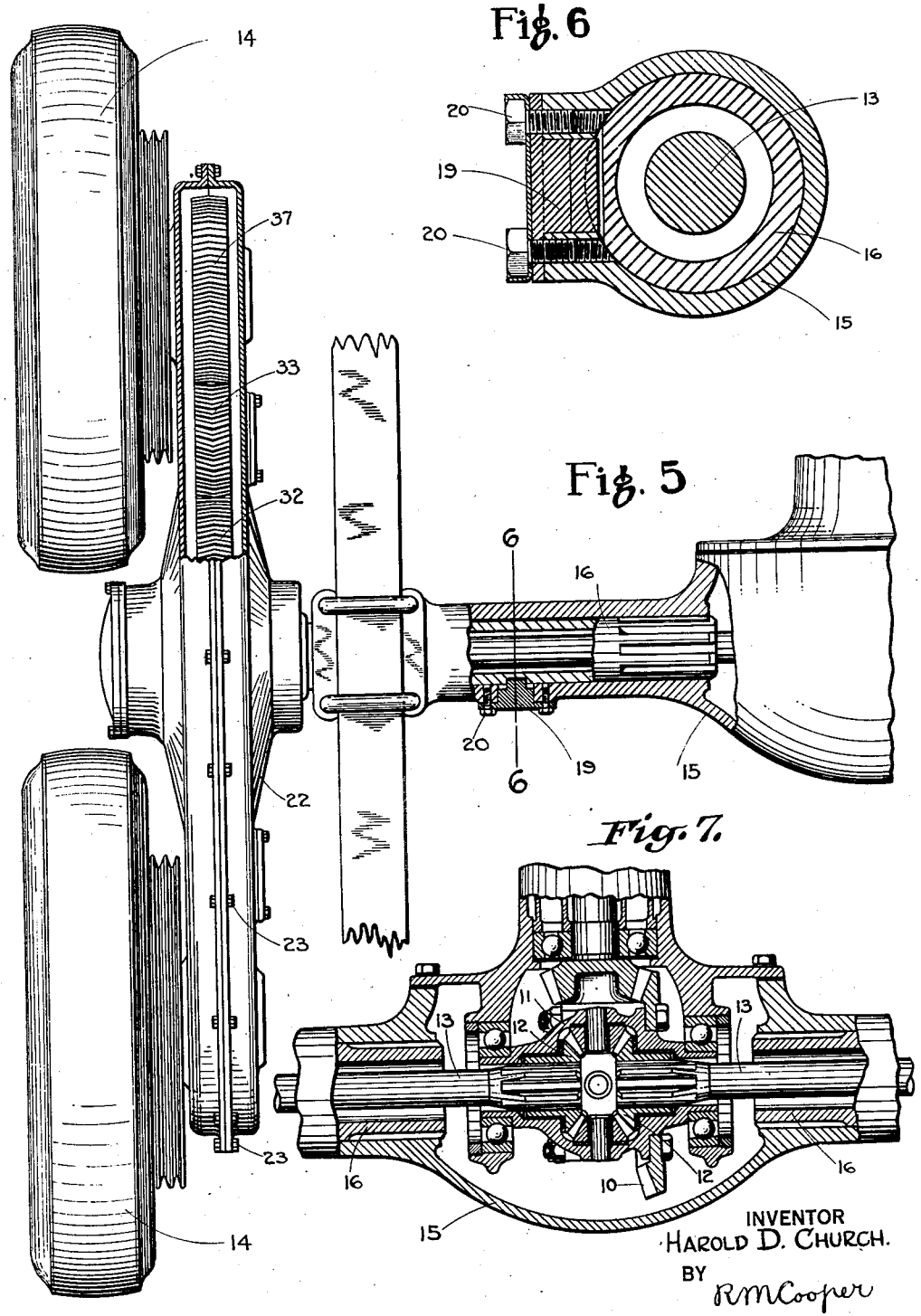
INVENTOR
HAROLD D. CHURCH.
BY
RMCooper
ATTORNEY Patented Jan. 5, 1932

1,839,785

UNITED STATES PATENT OFFICE

HAROLD D. CHURCH, OF CLEVELAND, OHIO, ASSIGNOR TO THE WHITE MOTOR COMPANY, OF CLEVELAND, OHIO, A CORPORATION OF OHIO

MOTOR VEHICLE

Application filed January 9, 1930. Serial No. 419,607.

This invention relates broadly to motor vehicles of the type which possess multiple sets of traction wheels.

It relates more specifically to that class of vehicles in which the sets of traction wheels are journalled on rigid, pivotally mounted carriers disposed at the sides of the vehicle.

It is an object of this invention to provide a sturdy and efficient axle, wheel, and power transmission assembly for vehicles of the class, above mentioned, which is economic of assembly and maintenance.

Other objects and attendant advantages will appear in the following description when read in connection with the accompanying drawings, in which—

Figure 1 is a side elevation of a motor bus having an axle, wheel and power transmission assembly constructed in accordance with this invention.

Figure 2 is a plan view of the bus, the rear portion of the body being broken away so as to show the rear axle and wheel assembly.

Figure 3 is a horizontal section taken through the traction wheels and the adjacent structure at one side of the bus, the section being taken on a line corresponding with line 3—3 of Figure 1.

Figure 4 is a side of the mechanism shown in Figure 3, certain parts being removed so as to show the internal gearing.

Figure 5 is a fragmentary plan view of the rear axle and wheel assembly of the bus, certain parts being broken away so as to show the internal construction.

Figure 6 is a section taken on line 6—6 of Figure 5, and

Figure 7 is a fragmentary plan view, almost entirely in section, of the rear axle assembly of the bus.

The motor bus illustrated in the drawings comprises generally a body A and a chassis B. Mounted at the forward end of the chassis, there is an internal combustion engine which drives the ring gear 10 of a conventional differential 11 mounted in an axle housing C at the rear of the bus, the drive being effected through various mechanisms similar to those employed in a conventional, four wheel automobile for the same purpose. The driven gears 12 of the differential receive the inner splined ends of a pair of transversely extending axles 13, the outer ends of which are connected by gear trains, hereinafter described, with the traction wheels 14 of the vehicle.

The axle housing C comprises a central section 15, a pair of sleeves 16 mounted in the ends of the section 15, and a pair of tubular members 17 secured to the protruding outer flanged ends of the sleeves by means of bolts 18. As clearly shown, the sleeves are secured against relative rotative movement with respect to the section 15 by means of complemental splined surfaces formed on the inner ends of the sleeves and the circumjacent walls of the section, and against relative longitudinal movement with respect to the section by means of locking members 19 which extend through apertures in the section into grooves formed in the sleeves. The locking members are detachably secured in place by means of screws 20 which extend into threaded apertures formed in the section.

Journaled on the outer end of each sleeve 16 and the associated tubular member 17 by means of anti-friction bearings 21 there is a two part casing 22. The casings 22 are supported by the traction wheels 14, and are adapted to oscillate about the sleeves 16 and the associated extensions 17 to maintain the traction wheels in engagement with the ground. As clearly shown, the traction wheels 14 are mounted on shafts 24 journaled in hollow bosses formed on the ends of the casings.

Secured upon the outer end of each axle 13 there is a gear 25 supported within the circumjacent sleeve 16 and extension 17 by means of anti-friction bearings 26. The gears 25 mesh with sets of circumferentially arranged gears 27, 28 and 29 supported by the sleeves 16 and the associated extensions 17. The gears 27, 28 and 29 are disposed in slots composed of complemental recesses formed in the adjoining surfaces of the sleeves 16 and the extensions 17, and are supported upon anti-friction bearings 30, mounted upon pins 31 carried in aligned apertures formed in the sleeves and the associated extensions. Mounted upon each set of gears 27, 28 and 29 there is a ring gear 32 formed with two sets of teeth, an internal set of straight spur teeth which mesh with complemental teeth formed on the gears 27, 28 and 29, and an exterior set of herringbone teeth which mesh with the like teeth of a pair of gears 33 and 34 carried by the casings 22. The gears 33 and 34 are supported within the casings 22 in anti-friction bearings 35 and 36 mounted respectively upon the inner and outer sections of the casing, and operate to maintain the ring gears 32 in operative positions through the interlocking engagement of their teeth with the teeth of the ring gears. Mounted within the ends of the casings 22 there are two gears 37 and 38 of the herringbone type which mesh respectively with gears 33 and 34, and which are formed with splined bores which receive the inner splined ends of the traction wheel drive shafts 24. The gears 37 and 38, as in the case of the gears 33 and 34, are supported within the casing 22 in anti-friction bearings, designated in this instance as bearings 39 and 40, mounted respectively upon the inner and outer sections of the casings, but unlike the gears 33 and 34 are permitted a slight endwise movement in their respective bearings. This permission of movement obviates the fine adjustment of the bearings 39 and 40 which would otherwise be necessary to insure the proper engagement of the teeth of the gears 37 and 38 with teeth of the gears 33 and 34. As will be readily appreciated, the interlocking engagement of the teeth of the gears 33 and 34 with teeth of the gears 37 and 38, maintains the gears 37 and 38 in proper relation to the gears 33 and 34.

It will be seen from the foregoing description that the traction wheel 15 at each side of the vehicle will be positively and simultaneously driven by the corresponding axle 14, the drive being transmitted through gears 25, 27, 28 and 29 to the ring gear 32, and from the ring gear 32 through gears 33 and 37, and gears 34 and 38 to the traction wheel drive shafts 24.

Although the foregoing description is necessarily of a detailed character, in order that the invention may be completely set forth, it is to be understood that specific terminology is not intended to be restrictive or confining, and various rearrangement of parts and modifications of structural details may be resorted to without departing from the spirit or scope of the invention.

I claim as my invention:

1. In a motor vehicle, the combination of a driving axle, a relatively fixed part, a rigid structure journalled on said part, shafts journalled in said structure, vehicle wheels mounted on said shafts, a gear on said axle, a set of gears supported by said part and meshing with the first named gear, a ring gear mounted upon and meshing with the gears of said set, and gearing carried by said structure constituting a driving connection between said ring gear and one of said shafts.

2. In a motor vehicle, the combination of a driving axle, a housing for said axle, a rigid structure journalled on said housing, shafts journalled in said structure, vehicle wheels mounted on said shafts, a gear on said axle, a set of gears supported by said housing and meshing with said first named gear, a ring gear mounted upon and meshing with the gears of said set, and gearing carried by said structure constituting a driving connection between said ring gear and said shafts.

3. In a motor vehicle, the combination with an axle housing comprising a transverse tubular element and an outwardly extending member secured to the outer end of said element, of a rigid longitudinally extending structure journalled on said element and said member, transverse shafts journalled in said structure, vehicle wheels mounted on said shafts, a driving axle disposed within said element, a gear on the outer end of said axle and supported by bearings in said element and said member, a set of gears supported by said element and said member arranged to mesh with said first named gear, a ring gear mounted upon and meshing with the gears of said set, and gearing carried by said structure constituting a driving connection between said ring gear and said shafts.

In testimony whereof I hereunto affix my signature this 4th day of January, 1930.

HAROLD D. CHURCH.